(12) United States Patent
Guo et al.

(10) Patent No.: US 8,024,435 B2
(45) Date of Patent: Sep. 20, 2011

(54) ROUTER AND METHOD FOR CONFIGURING IP ADDRESSES OF THE ROUTER

(75) Inventors: Hong-Jian Guo, Shanghai (CN); Yang Liu, Shanghai (CN)

(73) Assignees: Ambit Microsystems (Shanghai) Ltd., Shanghai (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 69 days.

(21) Appl. No.: 12/619,768

(22) Filed: Nov. 17, 2009

(65) Prior Publication Data
US 2011/0072120 A1 Mar. 24, 2011

(30) Foreign Application Priority Data
Sep. 22, 2009 (CN) .......................... 2009 1 0307445

(51) Int. Cl.
*G06F 15/177* (2006.01)
(52) U.S. Cl. ......... 709/222; 709/221; 709/250; 370/254
(58) Field of Classification Search .......... 709/220–222, 709/250; 370/254
See application file for complete search history.

(56) References Cited

U.S. PATENT DOCUMENTS

| 6,118,768 | A | * | 9/2000 | Bhatia et al. | 370/254 |
| 7,370,093 | B2 | * | 5/2008 | Ohara | 709/220 |
| 7,546,385 | B1 | * | 6/2009 | Henry et al. | 709/250 |
| 7,729,284 | B2 | * | 6/2010 | Ukrainetz et al. | 370/254 |
| 2007/0025372 | A1 | * | 2/2007 | Brenes et al. | 370/401 |
| 2009/0161581 | A1 | * | 6/2009 | Kim | 370/254 |

FOREIGN PATENT DOCUMENTS
EP 1343297 B1 * 4/2011

* cited by examiner

*Primary Examiner* — Oanh Duong
(74) *Attorney, Agent, or Firm* — Altis Law Group, Inc.

(57) ABSTRACT

A method for configuring IP addresses of a router broadcasts a dynamic host configuration protocol (DHCP) discover packet over a network for receiving a DHCP offer packet sent from the modem. The DHCP offer packet comprises the private IP address of the modem. The method further obtains the private IP address of the modem from the DHCP offer packet, and configures IP addresses of a WAN port and a LAN port of the router according to the private IP address of the modem, so as to allow the private IP address of the modem to be in the same network segment with the IP address of the WAN port but in different network segments with the IP address of the LAN port.

15 Claims, 3 Drawing Sheets

ROUTER AND METHOD FOR CONFIGURING IP ADDRESSES OF THE ROUTER

BACKGROUND

1. Technical Field

Embodiments of the present disclosure generally relate to network equipments and methods for establishing networks, and more particularly to a router and a method for configuring internet protocol (IP) addresses of the router.

2. Description of Related Art

A router is a device that connects two different network segments together. A network segment is a portion of a computer network where every device communicates with each other using the same physical layer. Occasionally, a network segment refers to a subnetwork.

Usually, a router may have one wide area network (WAN) port and at least one local area network (LAN) port. The WAN port of the router is an Ethernet port that is wired to its counterpart port on a cable or DSL modem. The LAN port of the router accommodates wired Ethernet computers, or printers, for example.

A modem is a device that enables a computer to transmit information over, for example, telephone or cable lines. Computer information is stored digitally, whereas information transmitted over telephone lines is transmitted in the form of analog waves. The modem converts between these two forms.

If multiple computers around the home or office want to be networked together to share the Internet connection via telephone or cable lines, the multiple computers need to be connected to a modem linked to the Internet via a router. In addition to the connection, internet protocol (IP) addresses of the router and the modem need to be configured correctly. That is, the IP address of a LAN port of the modem must be in the same network segment with the IP address of a WAN port of the router and in different network segments with the IP address of a LAN port of the router.

At present, a common used method of configuring the IP addresses of the router and the modem is manual, which is troublesome and time wasting.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
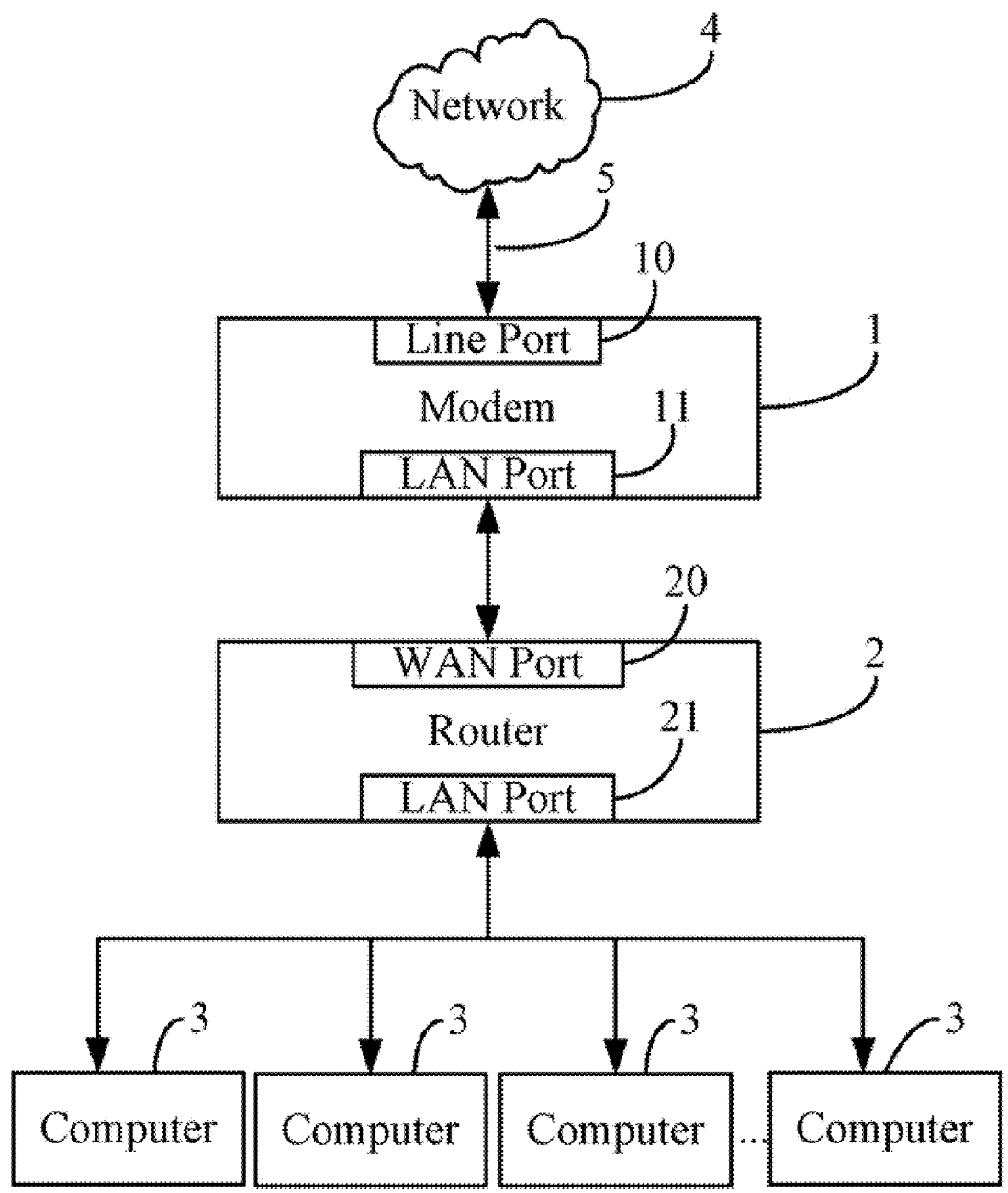
FIG. 1 is a block diagram of one embodiment of connections between multiple computers, a router, a modem, and a network.

FIG. 1 is a block diagram of one embodiment of connections between multiple computers 3, a router 2, a modem 1, and a network 4. In present embodiment, each of the computers 3 connects to the router 2 using a local area network (LAN) port 21 of the router 2. The router 2 communicates with the modem 1 by connecting a wide area network (WAN) port 20 of the router 2 with a LAN port 11 of the modem 1. The modem 1 connects to the network 4 through a telephone line 5 plugged into a line port 10 of the modem 1. The modem 1 may be an asymmetrical digital subscriber loop (ADSL) modem, and the network 4 may be the Internet, for example.

Figure 2:
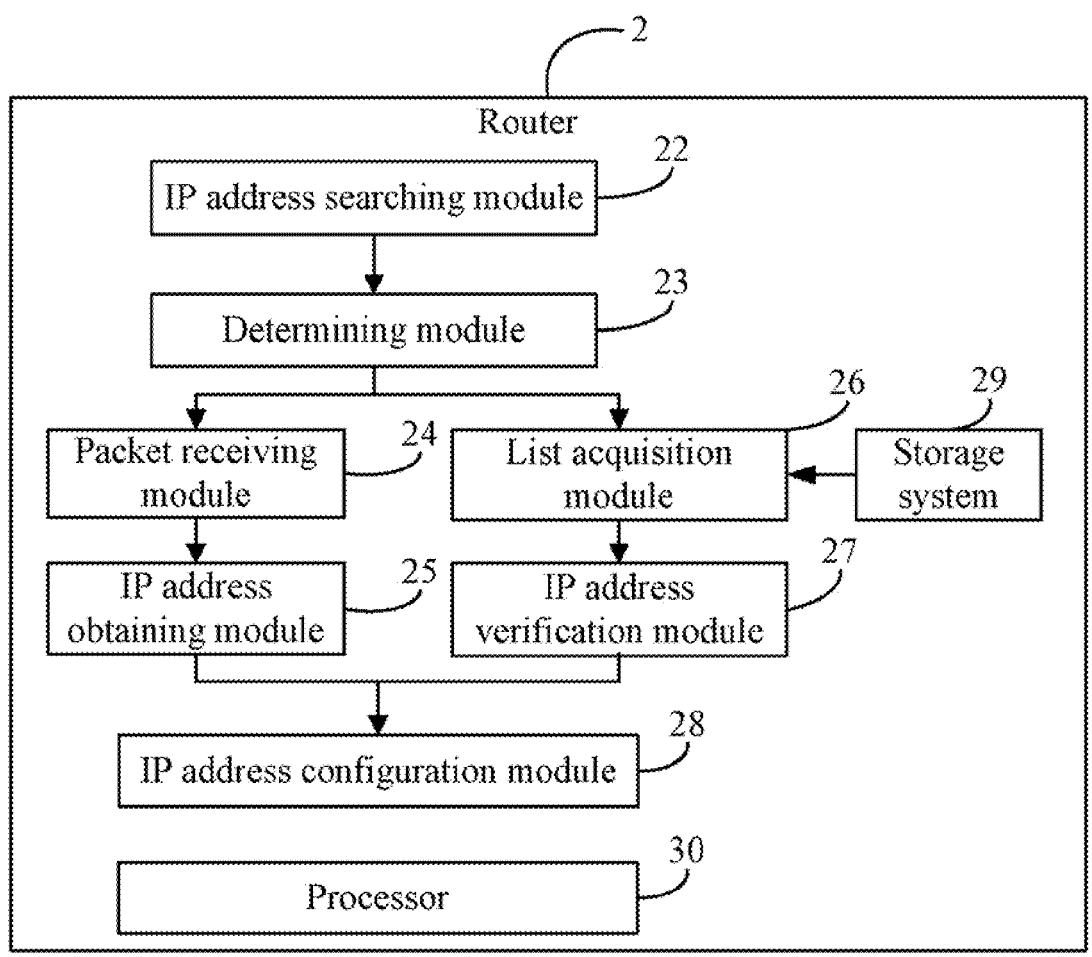
FIG. 2 is a block diagram of functional modules of the router in FIG. 1.

FIG. 2 is a block diagram of functional modules of the router 2 in FIG. 1. In one embodiment, the functional modules of the router 2 include an IP address searching module 22, a determining module 23, a packet receiving module 24, an IP address obtaining module 25, a list acquisition module 26, an IP address verification module 27, and an IP address configuration module 28.

In one embodiment, at least one processor 30 of the router 2 executes one or more computerized codes of the modules 22-28 to configure IP addresses of the LAN port 21 and the WAN port 20 of the router 2. The one or more computerized codes of the functional modules 22-28 may be stored in a storage system 29 of the router 2. In addition, the storage system 29 may also store an IP address list. The IP address list records a plurality of IP addresses, which are commonly used by the LAN port 11 of the modem 1. The IP addresses recorded in the IP address list include, but are not limited to, 192.168.1.1, 192.168.2.1, 192.168.1.254, 10.0.0.1, and 172.16.254.1, for example.

The IP address searching module 22 is operable to broadcast a dynamic host configuration protocol (DHCP) discover packet over the network 4 to search an IP address of the LAN port 11 of the modem 1. The IP address of the LAN port 11 of the modem 1 is referred to as the private IP address of the modem 1 hereinafter. It may be understood that, the DHCP is a network application protocol used by client devices (such as the router 2) to obtain configuration information of a server (such as the modem 1) for operation in an IP network. The configuration information is the private IP address of the modem 1. The DHCP discover packet may include a source address 0.0.0.0, a destination address 255.255.255.255, and a media access control (MAC) address of the router 2.

The determining module 23 is operable to determine whether there is a reply from the modem 1 responding to the DHCP discover packet, and further determine whether a broadcast count of broadcasting the DHCP discover packet equals to a predetermined value if there is no reply from the modem 1. In present embodiment, the reply is a DHCP offer packet. The predetermined value may be 4, for example. If there is no reply from the modem 1 and the broadcast count is less than the predetermined value, the IP address searching module 22 may broadcast the DHCP discover packet one more time. Otherwise, if there is no reply from the modem 1 and the broadcast count equals to the predetermined value, an error information will be sent to the router 2.

The packet receiving module 24 is operable to receive the DHCP offer packet sent from the modem 1. It may be understood that, the DHCP offer packet includes the private IP address of the modem 1.

The IP address obtaining module 25 is operable to obtain the private IP address of the modem 1 from the DHCP offer packet.

The list acquisition module 26 is operable to acquire the IP address list from the storage system 29 if there is no reply from the modem 1 and the broadcast count equals to the predetermined value. As mentioned above, the IP address list records a plurality of IP addresses.

The IP address verification module 27 is operable to broadcast a plurality of address resolution protocol (ARP) packets over the network 4 to verify if one of the IP addresses recorded in the IP address list is the private IP address of the modem 1. In present embodiment, each ARP packet includes one IP address recorded in the IP address list. The IP address verification module 27 is further operable to determine whether there is a reply from the modem 1 responding to one of the ARP packets, so as to locate the private IP address of the modem 1 according to the reply, or assign a default private IP address to the modem 1 if there is no reply from the modem 1 responding to the ARP packets. For example, if a reply responding to the ARP packet including the IP address 192.168.1.1 from the modem 1 is received by the router 2, the IP address verification module 27 locates the private IP address of the modem 1 as 192.168.1.1.

The IP address configuration module 28 is operable to configure IP addresses of the WAN port 20 and the LAN port 21 of the router 2 according to the private IP address of the modem 1, so as to allow the private IP address of the modem 1 to be in the same network segment with the IP address of the WAN port 20 but in different network segments with the IP address of the LAN port 21. For example, if the private IP address of the modem 1 is 192.168.1.1, the IP addresses of the WAN port 20 of the router 2 may be configured to 192.168.255.255, and the IP addresses of the LAN port 21 of the router 2 may be configured to 192.169.1.1, for example.

Figure 3:
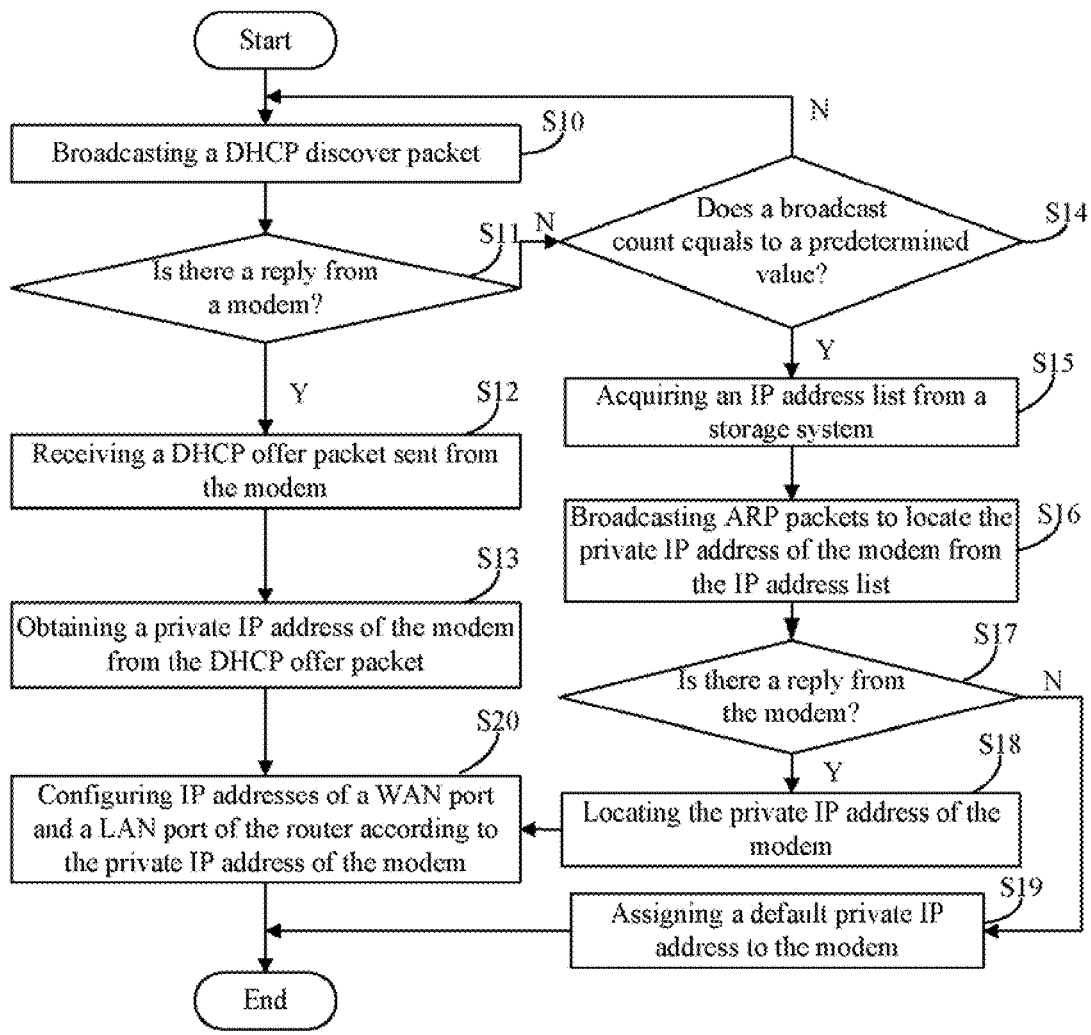
FIG. 3 is a flowchart of one embodiment of a method for configuring IP addresses of the router in FIG. 1.

FIG. 3 is a flowchart illustrating one embodiment of a method for configuring IP addresses of the router 2. Depending on the embodiment, additional blocks in the flow of FIG. 3 may be added, others removed, and the ordering of the blocks may be changed.

In block S10, the IP address searching module 22 broadcasts a dynamic host configuration protocol (DHCP) discover packet over the network 4. As mentioned above, the DHCP is a network application protocol used by client devices (such as the router 2) to obtain configuration information of a server (such as the modem 1) for operation in an IP network. In present embodiment, the configuration information is the private IP address of the modem 1. The DHCP discover packet may include a source address 0.0.0.0, a destination address 255.255.255.255, and a media access control (MAC) address of the router 2.

In block S11, the determining module 23 determines whether there is a reply from the modem 1 responding to the DHCP discover packet. It may be understood that, the reply is a DHCP offer packet. If there is no reply, block S14 is implemented. Otherwise, if there is a reply responding to the DHCP discover packet, block S12 is implemented.

In block S12, the packet receiving module 24 receives the DHCP offer packet sent from the modem 1. It may be understood that, the DHCP offer packet includes the private IP address of the modem 1.

In block S13, the IP address obtaining module 25 obtains the private IP address of the modem 1 from the DHCP offer packet.

In block S14, the determining module 23 determines whether a broadcast count of broadcasting the DHCP discover packet equals to a predetermined value. The predetermined value may be 4, for example. If the broadcast count is less than the predetermined value, block S10 is repeated. Otherwise, if the broadcast count equals to the predetermined value, block S15 is implemented.

In block S15, the list acquisition module 26 acquires the IP address list from the storage system 29. As mentioned above, the IP address list records a plurality of IP addresses which are commonly used by the LAN port 11 of the modem 1. The IP addresses recorded in the IP address list include, but are not limited to, 192.168.1.1, 192.168.2.1, 192.168.1.254, 10.0.0.1, and 172.16.254.1, for example.

In block S16, the IP address verification module 27 broadcasts a plurality of address resolution protocol (ARP) packets over the network 4. In present embodiment, each ARP packet includes one IP address recorded in the IP address list.

In block S17, the IP address verification module 27 determines whether there is a reply from the modem 1 responding to one of the ARP packets. If there is no reply responding to the ARP packets, block S19 is implemented. Otherwise, if there is a reply from the modem 1 responding to one of the ARP packets, block S18 is implemented.

In block S18, the IP address verification module 27 locates the private IP address of the modem 1 according to the reply from the modem 1 responding to one of the ARP packets. For example, if there is a reply from the modem 1 responding to the ARP packet including the IP address 192.168.1.1, the IP address verification module 27 locates the private IP address of the modem 1 as 192.168.1.1.

In block S19, the IP address verification module 27 assigns a default private IP address to the modem 1.

In block S20, the IP address configuration module 28 configures IP addresses of the WAN port 20 and the LAN port 21 of the router 2 according to the private IP address of the modem 1, so as to allow the private IP address of the modem 1 to be in the same network segment with the IP address of the WAN port 20 but in different network segments with the IP address of the LAN port 21. For example, if the private IP address of the modem 1 is 192.168.1.1, the IP addresses of the WAN port 20 of the router 2 may be configured to 192.168.255.255, and the IP addresses of the LAN port 21 of the router 2 may be configured to 192.169.1.1, for example.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A router, comprising:
    an internet protocol (IP) address searching module operable to broadcast a dynamic host configuration protocol (DHCP) discover packet over a network so as to search a private IP address of a modem connected with the router;
    a packet receiving module operable to receive a DHCP offer packet from the modem, wherein the DHCP offer packet comprises the private IP address of the modem;
    an IP address obtaining module operable to obtain the private IP address of the modem from the DHCP offer packet;
    an IP address configuration module operable to configure IP addresses of a wide area network (WAN) port and a local area network (LAN) port of the router according to the private IP address of the modem, so as to allow the private IP address of the modem to be in the same network segment with the IP address of the WAN port but in different network segments with the IP address of the LAN port;
    a storage system that stores an IP addresses list that records a plurality of IP addresses;
    a determining module operable to determine whether a broadcast count of broadcasting the DHCP discover packet equals to a predetermined value upon the condition that there is no reply from the modem responding to the DHCP discover packet, so that the IP address searching module broadcasts the DHCP discover packet one more time upon the condition that the broadcast count is less than the predetermined value;

a list acquisition module operable to acquire the IP address list from the storage system upon the condition that the broadcast count equals to the predetermined value;

an IP address verification module operable to broadcast a plurality of address resolution protocol (ARP) packets via the network to verify if one of the IP addresses recorded in an IP address list is the private IP address of the modem; and a processor that executes the IP address searching module, the packet receiving module, the IP address obtaining module, and the IP address configuration module.

2. The router as described in claim 1, wherein the DHCP discover packet comprises a source address 0.0.0.0, a destination address 255.255.255.255, and a media access control (MAC) address of the router.

3. The router as described in claim 1, wherein the plurality of IP addresses recorded in the IP address list comprise: 192.168.1.1, 192.168.2.1, 192.168.1.254, 10.0.0.1, and 172.16.254.1.

4. The router as described in claim 1, wherein each of the ARP packets comprises one IP address recorded in the IP address list.

5. The router as described in claim 1, wherein the IP address verification module is further operable to assign a default private IP address to the modem if there is no reply from the modem responding to the ARP packets.

6. A method for configuring IP addresses of a router, the method being performed by execution of computer readable program code by at least one processor, the method comprising:

broadcasting a dynamic host configuration protocol (DHCP) discover packet over a network;

receiving a DHCP offer packet from the modem, wherein the DHCP offer packet comprises a private IP address of the modem;

obtaining the private IP address of the modem from the DHCP offer packet;

configuring IP addresses of a WAN port and a LAN port of the router according to the private IP address of the modem, so as to allow the private IP address of the modem to be in the same network segment with the IP address of the WAN port but in different network segments with the IP address of the LAN port;

storing an IP addresses list that records a plurality of IP addresses into a storage system of the router;

determining whether a broadcast count of broadcasting the DHCP discover packet equals to a predetermined value upon the condition that there is no reply from the modem responding to the DHCP discover packet;

returning to the broadcasting upon the condition that the broadcast count is less than the predetermined value;

acquiring the IP address list from the storage system upon the condition that the broadcast count equals to the predetermined value;

broadcasting a plurality of address resolution protocol (ARP) packets via the network; and locating the private IP address of the modem according to one of the ARP packets which is responded by the modem.

7. The method as described in claim 6, wherein the DHCP discover packet comprises a source address 0.0.0.0, a destination address 255.255.255.255, and a media access control (MAC) address of the router.

8. The method as described in claim 6, wherein each of the ARP packets comprises one IP address recorded in the IP address list.

9. The method as described in claim 6, further comprising:
giving a default private IP address to the modem if there is no reply from the modem responding to the ARP packets.

10. The method as described in claim 6, wherein the plurality of IP addresses recorded in the IP address list comprise: 192.168.1.1, 192.168.2.1, 192.168.1.254, 10.0.0.1, and 172.16.254.1.

11. A non-transitory storage medium having stored thereon instructions that, when executed by a processor, cause the processor to perform a method for configuring IP addresses of a router, wherein the method comprises:

broadcasting a dynamic host configuration protocol (DHCP) discover packet over a network;

receiving a DHCP offer packet from the modem, wherein the DHCP offer packet comprises a private IP address of the modem;

obtaining the private IP address of the modem from the DHCP offer packet;

configuring IP addresses of a WAN port and a LAN port of the router according to the private IP address of the modem, so as to allow the private IP address of the modem to be in the same network segment with the IP address of the WAN port but in different network segments with the IP address of the LAN port;

storing an IP addresses list that records a plurality of IP addresses into a storage system of the router;

determining whether a broadcast count of broadcasting the DHCP discover packet equals to a predetermined value upon the condition that there is no reply from the modem responding to the DHCP discover packet;

returning to the broadcasting upon the condition that the broadcast count is less than the predetermined value;

acquiring the IP address list from the storage system upon the condition that the broadcast count equals to the predetermined value;

broadcasting a plurality of address resolution protocol (ARP) packets via the network; and locating the private IP address of the modem according to one of the ARP packets which is responded by the modem.

12. The non-transitory storage medium as described in claim 11, wherein the DHCP discover packet comprises a source address 0.0.0.0, a destination address 255.255.255.255, and a media access control (MAC) address of the router.

13. The non-transitory storage medium as described in claim 11, wherein each of the ARP packets includes one IP address recorded in the IP address list.

14. The non-transitory storage medium as described in claim 11, further comprising:
giving a default private IP address to the modem if there is no reply from the modem responding to the ARP packets.

15. The non-transitory storage medium as described in claim 11, wherein the plurality of IP addresses recorded in the IP address list comprise: 192.168.1.1, 192.168.2.1, 192.168.1.254, 10.0.0.1, and 172.16.254.1.

* * * * *